United States Patent
Sakai et al.

(10) Patent No.: US 8,169,567 B2
(45) Date of Patent: May 1, 2012

(54) VIEWING ANGLE CONTROLLING LIQUID CRYSTAL PANEL AND DISPLAY DEVICE

(75) Inventors: Takehiko Sakai, Osaka (JP); Dai Chiba, Osaka (JP); Katsuhiko Morishita, Osaka (JP); Yoshiharu Kataoka, Osaka (JP); Chikanori Tsukamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

(21) Appl. No.: 12/522,081

(22) PCT Filed: Aug. 27, 2007

(86) PCT No.: PCT/JP2007/066513
§ 371 (c)(1),
(2), (4) Date: Jul. 2, 2009

(87) PCT Pub. No.: WO2008/093445
PCT Pub. Date: Aug. 7, 2008

(65) Prior Publication Data
US 2010/0060824 A1    Mar. 11, 2010

(30) Foreign Application Priority Data
Jan. 31, 2007 (JP) .................................. 2007-022301

(51) Int. Cl.
*G02F 1/1347* (2006.01)
*G02F 1/1343* (2006.01)

(52) U.S. Cl. .............. 349/74; 349/77; 349/96; 349/119; 349/139

(58) Field of Classification Search ............ 349/74, 349/75, 77, 82, 83, 117, 139, 142, 96, 119; 345/4, 50, 87
See application file for complete search history.

(56) References Cited

U.S. PATENT DOCUMENTS
7,528,913 B2 *  5/2009  Kobayashi .................... 349/117
7,880,843 B2 *  2/2011  Morishita et al. ............. 349/119
(Continued)

FOREIGN PATENT DOCUMENTS
JP    2005/134678    5/2005
(Continued)

OTHER PUBLICATIONS
International Search Report for PCT/JP2007/066513, filed Oct. 2, 2007.

*Primary Examiner* — Dung Nguyen
*Assistant Examiner* — Tai Duong
(74) *Attorney, Agent, or Firm* — Nixon & Vanderhye P.C.

(57) ABSTRACT

A viewing angle controlling liquid crystal panel in which uniformity of a shielding effect in a screen is further improved is provided. Linearly polarized light enters a liquid crystal layer. Further, the liquid crystal layer is provided, on a light exit side of the liquid crystal layer, with a polarizing plate transmitting only a component of light having exited from the liquid crystal layer which component is parallel to a polarization axis of the linearly polarized light having entered the liquid crystal layer. Liquid crystal molecules contained in the liquid crystal layer are tilted in a direction parallel to or perpendicular to the polarization axis of the linearly polarized light having entered the liquid crystal layer. In addition, an electrode (26) is provided so that two or more different voltages can be applied to the liquid crystal layer simultaneously.

9 Claims, 12 Drawing Sheets

U.S. PATENT DOCUMENTS

| | | | |
|---|---|---|---|
| 8,045,097 B2 * | 10/2011 | Sakai et al. | 349/74 |
| 2005/0243265 A1 * | 11/2005 | Winlow et al. | 349/178 |
| 2005/0259193 A1 | 11/2005 | Sumiyoshi et al. | |
| 2006/0158590 A1 * | 7/2006 | Matsushima | 349/117 |
| 2007/0139584 A1 * | 6/2007 | Jin et al. | 349/74 |
| 2008/0001849 A1 * | 1/2008 | Jin et al. | 345/4 |
| 2008/0137000 A1 | 6/2008 | Sumiyoshi et al. | |
| 2008/0316198 A1 | 12/2008 | Fukushima et al. | |

FOREIGN PATENT DOCUMENTS

| | | |
|---|---|---|
| RU | 2 031 424 C1 | 3/1995 |
| WO | WO 2006/030702 * | 3/2006 |

* cited by examiner (a)

(b)

(a)

(b)

(a)

(b)

VIEWING ANGLE CONTROLLING LIQUID CRYSTAL PANEL AND DISPLAY DEVICE

This application is the U.S. national phase of International Application No. PCT/JP2007/066513 filed 27 Aug. 2007, which designated the U.S. and claims priority to Japan Application No. 2007-022301 filed 31 Aug. 2007, the entire contents of each of which are hereby incorporated by reference.

TECHNICAL FIELD

The present invention relates to a viewing angle controlling liquid crystal panel which controls a viewing angle of a display panel and a display device including a display panel and the viewing angle controlling liquid crystal panel.

BACKGROUND ART

Generally, display devices are required to have a viewing angle as wide as possible so that an image can be seen sharply from any visual angles. In particular, in liquid crystal display devices which are prevalent in these years, because a refractive index of a liquid crystal molecule has dependency on visual angles, various techniques have been developed for widening the viewing angle. Note that (i) the visual angle indicates an angle between a screen of a display device and a direction in which the screen is viewed; and (ii) the viewing angle indicates an angular range in which a certain display quality can be obtained.

Depending on an environment in which a display device is used, however, it may be preferable to have a narrow viewing angle allowing only a user himself to view display contents.

For example, a laptop personal computer, a personal data assistant (PDA), and a mobile phone tend to be used in public places where an unspecified number of people may be present, for example, in a train and in an airplane. In such a use environment, in view of protection of confidentiality and privacy, it is preferable that a display device has a narrower viewing angle in order to prevent surrounding people from peeking at display contents. As described above, it has been increasingly requested that a viewing angle of one display device can be limited within a certain range depending on use conditions and a direction of thus limited viewing angle can be changed. Note that this request is directed to not only liquid crystal display devices but also any other display devices in common.

In order to fulfill such a request, for example, Patent Literature 1 proposes a liquid crystal structure including a liquid crystal pixel arrangement section constituting a liquid crystal plane, a shielding element arrangement section in which shielding elements are provided. In this liquid crystal structure, how an image displayed in the liquid crystal pixel arrangement section is seen can be controlled, for example, by causing the shielding element arrangement section to be in an orderly shielding state. Specifically, as illustrated in FIG. 12, how images are seen is controlled so that only an image B can be seen in a normal line direction of a screen by shielding an image A by use of the shielding elements whereas only the image A can be seen, by shielding the image B by use of the shielding elements, in a visual line in oblique directions that deviate from the normal line direction.

CITATION LIST

Patent Literature 1

Japanese Patent Application Publication, Tokukai, No. 2005-134678 (Publication Date: May 26, 2005)

SUMMARY OF INVENTION

However, a conventional structure described in Patent Literature 1 has a problem in that shielding against a view in an oblique direction is not sufficient.

For completely shielding an image in a view in an oblique direction, it is necessary to shield an entire screen by the shielding element arrangement section. In a case where the entire screen is shielded, however, an image cannot be seen even in the normal line direction. Accordingly, such an arrangement cannot be adopted. When an image is shielded against a view in the oblique direction while the image is kept visible with respect to a view in the normal direction, the shielding of the image against a view in the oblique direction inevitably becomes insufficient.

(Utilization of Refractive Index Anisotropy)

To solve the above problem, a possible arrangement is an arrangement in which only how an image is seen at an oblique angle is controlled by utilization of refractive index anisotropy of liquid crystal molecules.

A display device (liquid crystal display device) having such an arrangement includes a liquid crystal display panel as a display panel, and a viewing angle controlling liquid crystal panel. Further, this display device is configured such that a voltage application to liquid crystal molecules of the viewing angle controlling liquid crystal panel hardly changes a retardation in the normal line direction, but changes a retardation in the oblique direction, Specifically, for example, the display device can be configured such that liquid crystal molecules are arranged in homogeneous alignment and a direction in which long axes of the liquid crystal molecules are tilted at the time when a voltage is applied is set to coincide with a transmission axis of a polarizing plate. The following explains an overview of the arrangement with reference to FIG. 9.

(Arrangement)

FIG. 9 is a cross sectional view illustrating an arrangement of a liquid crystal display device 1 including a viewing angle controlling liquid crystal panel 5 and a liquid crystal display panel 6. As illustrated in FIG. 9, the liquid crystal display device 1 includes the viewing angle controlling liquid crystal panel 5, the liquid crystal display panel 6, and a backlight 7, which are provided in this order. Each of the viewing angle controlling liquid crystal panel 5 and the liquid crystal display panel 6 has an identical arrangement with an arrangement of a typical liquid crystal display panel. Namely, the viewing angle controlling liquid crystal panel 5 includes: a first liquid crystal cell 10 in which a first liquid crystal layer 15 is sandwiched between a first upper substrate 22 and a first lower substrate 27. On one outer side of the first liquid crystal cell 10, a first upper wave plate 21 and a first upper polarizing plate 20 are provided. On the other outer side of the first liquid crystal cell 10, a first lower wave plate 28 and a first lower polarizing plate 29 are provided. Further, on a side of the first upper substrate 22 which side does not face the first liquid crystal layer 15, a first upper electrode 23 and a first upper alignment film 24 are provided. On a side of the first lower substrate 27 which side does not face the first liquid crystal layer 15, a first lower electrode 26 and a first lower alignment film 25 are provided. The first upper electrode 23 and the first lower electrode 26 are overall electrodes each of which covers a substantially entire surface of a screen 50.

Like the viewing angle controlling liquid crystal panel 5, the liquid crystal display panel 6 also has the same arrangement as an arrangement of a typical liquid crystal display panel. Namely, the liquid crystal display panel 6 includes a second liquid crystal cell 11 in which a second liquid crystal layer 16 is sandwiched between a second upper substrate 32 and a second lower substrate 37. On one side of the second liquid crystal cell 11, a second upper wave plate 31 and a second upper polarizing plate 30 are provided. On the other side of the second liquid crystal cell 11, a second lower wave plate 38 and a second lower polarizing plate 39 are provided. Further, on a side of the second upper substrate 32 which side does not face the second liquid crystal layer 16, a second upper electrode 33 and a second upper alignment film 34 are provided. On a side of the second lower substrate 37 which side does not face the second liquid crystal layer 16, a second lower electrode 36 and a second lower alignment film 35 are provided.

(Way of Shielding)

The following explains how to shield an image against a view in an oblique direction in the liquid crystal display device 1, with reference to (a) and (b) of FIG. 10. (a) of FIG. 10 is a diagram illustrating how first liquid crystal molecules 17 are seen at the time when no voltage is applied to the first liquid crystal molecules 17 in the viewing angle controlling liquid crystal panel 5. (b) of FIG. 10 is a diagram illustrating how the first liquid crystal molecules 17 are seen at the time when a voltage is applied to the first liquid crystal molecules 17. In (a) and (b) of FIG. 10, "J" indicates a viewer who views, in the normal line direction of a screen, a liquid crystal display device including the viewing angle controlling liquid crystal panel 5, and "K" indicates a viewer who views, in an oblique direction that deviates from the normal line direction of the screen, the liquid crystal display device including the viewing angle controlling liquid crystal panel 5. Further, in (a) and (b) of FIG. 10, "X1" indicates a transmission axis of the first upper polarizing plate (not illustrated) of the viewing angle controlling liquid crystal panel 5, and "X2" indicates a transmission axis of the first lower polarizing plate (not illustrated) of the viewing angle controlling liquid crystal panel 5.

As illustrated in (a) and (b) of FIG. 10, in the viewing angle controlling liquid crystal panel 5, the first liquid crystal molecules 17 are in homogeneous alignment. The first liquid crystal molecules 17 are in the first liquid crystal layer 15 which is sandwiched between the first upper substrate 22 and the first lower substrate 27.

The first upper polarizing plate (not illustrated) that is provided on an outer side of the first upper substrate 22 and the first lower polarizing plate (not illustrated) that is provided on an outer side of the first lower substrate 27 are arranged in such a manner that each of the transmission axes X1 and X2 coincides with a direction of long axes of the first liquid crystal molecules 17 in homogeneous alignment.

The following explains how the first liquid crystal molecules 17 are seen by the viewers J and K. As illustrated in (a) of FIG. 10, when no voltage is applied to the first liquid crystal molecules 17, the first liquid crystal molecules 17 are not tilted. Accordingly, the first liquid crystal molecules 17 are seen by both of the viewers J and K in the same manner (not tilted).

On the other hand, as illustrated in (b) of FIG. 10, when a voltage is applied to the first liquid crystal molecules 17, the first liquid crystal molecules 17 in homogeneous alignment becomes tilted only in a thickness direction of the first liquid crystal layer 15. Note that, because the first liquid crystal molecules 17 are arranged in homogeneous alignment, the first liquid crystal molecules 17 are not tilted (rotated) in a direction parallel to the first upper substrate 22 and the first lower substrate 27.

As a result, the first liquid crystal molecules 17 appears (not tilted) to the viewer J in the same manner as in the case where no voltage is applied. However, the first liquid crystal molecules 17 appears tilted to the viewer K, unlike the first liquid crystal molecules 17 to which no voltage is being applied.

This means that the voltage application to the first liquid crystal molecules 17 in the viewing angle controlling liquid crystal panel 5 illustrated in (a) and (b) of FIG. 10 hardly changes a retardation in the normal line direction, but changes only a retardation in an oblique direction.

Accordingly, the viewing angle controlling liquid crystal panel 5 to which a voltage is being applied is designed to perform a black display (be shielding) with respect to a view on the liquid crystal display device 1 in a direction where it is desired to shield an image. In other words, a retardation in an oblique direction at the time when a voltage is applied is set to a retardation in the case of the black display. This makes it possible to shield, against a view in an oblique direction, an image displayed on the liquid crystal display panel 6 provided behind the viewing angle controlling liquid crystal panel 5, while how the image is seen in the normal line direction is not changed.

This makes it possible to solve the technical problem described in Patent Literature 1, that is, insufficient shielding against a view in an oblique direction.

(Uniformity in Screen)

However, in the viewing angle controlling liquid crystal panel that utilizes refractive index anisotropy of the liquid crystal molecules, a retardation varies depending on visual angles. In particular, in a case where a screen size becomes larger than a certain size, it becomes difficult to display a black display uniformly all over the screen. In other words, a range of visual angles in which shielding is reliably provided (restricted-view angle) is limited.

This is because a so-called optical path length (a length of a ray of light which passes through a liquid crystal layer) has dependency on visual angles. Accordingly, a retardation of the viewing angle controlling liquid crystal panel varies depending on a position where a viewer views the screen. This is explained below, with reference to FIGS. 11 and 9.

FIG. 11 is a diagram illustrating a scene where a viewer M views different positions on the liquid crystal display device 1. As illustrated in FIG. 11, the viewer M views different positions on the screen 50, for example, a far position ("a" in FIG. 11), a center position ("c" in FIG. 11), and a near position ("b" in FIG. 11). Each visual angle made between the screen 50 and a direction of a view for viewing each position is different. This difference becomes significant when a display size increases.

The difference in the visual angles causes retardation difference in the liquid crystal layer. This is because a retardation of the liquid crystal layer is a value obtained by multiplying a difference (birefringence index difference) between a refractive index of a slow axis of the liquid crystal molecules and a refractive index of a fast axis of the liquid crystal molecules by a length of a ray of light passing through the liquid crystal layer (optical path length), and, as the visual angle varies, the optical path length varies.

More specific explanation is provided below with reference to FIG. 9. Arrows d, e, and f in FIG. 9 show respective visual lines (the same as lines of light rays emitted from the liquid crystal display device 1) in a case where the viewer M views a far position of the screen 50 ("a" in FIG. 11), a near position of the screen 50 ("b" in FIG. 11), and a center position of the screen 50 ("c" in FIG. 11). Further, $\theta 1$, $\theta 2$, and $\theta 3$ in FIG. 9 show respective angles including an angle between the screen 50 and the visual line d, an angle between the screen 50 and the visual line e, and an angle between the screen 50 and the visual line f. Further, L1, L2, and L3 in FIG. 9 shows respective optical path lengths of the visual lines d, e, and f in the first liquid crystal layer 15.

As illustrated in FIG. 9, the visual angle $\theta 1$ between the screen 50 and the visual line d, the visual angle $\theta 2$ between the screen 50 and the visual line e, and the visual angle $\theta 3$ between the screen 50 and the visual line f have a relation such that θ2>θ3>θ1, and the optical path lengths L1, L2, and L3 have a relation such that L1>L3>L2.

Namely, compared with a case where the viewer M views the center position on the screen 50, the visual angle with respect to the screen 50 is smaller and the optical path length is longer in a case the viewer M views the far position on the screen 50. This increases a retardation, On the other hand, compared with a case where the viewer M views the center position, the visual angle with respect to the screen 50 is larger and the optical path length is shorter in a case where the viewer M views the front position on the screen 50. This decreases a retardation.

This means that, when the viewing angle controlling liquid crystal panel 5 is designed to maximize a shielding effect (display a black display) in a case where the viewer M views the center position on the screen 50, the blocking effect decreases and light leakage occurs in a case where the viewer M views a position other than the center position, for example, a near position or a far position on the screen 50. Namely, when the shielding effect is configured to be maximum in any one position on the screen 50, light leakage may occur in positions other than the one position on the screen 50.

As described above, in the viewing angle control utilizing refractive index anisotropy of liquid crystal molecules, a retardation varies depending on visual angles. Therefore, it has been difficult to uniformly shield the entire screen of the liquid crystal display device because the shielding effect varies depending on a position on the screen which a viewer views from one position.

The present invention is made in view of the conventional problem described above. An object of the present invention is to provide a viewing angle controlling liquid crystal panel and a display device for each of which uniformity of a shielding effect in the screen is further improved.

In order to solve the problem above, a viewing angle controlling liquid crystal panel of the present invention provided on a front surface or a back surface of a display panel and controlling a viewing angle of an image displayed on the display panel, the viewing angle controlling liquid crystal panel includes: a liquid crystal layer; and an electrode for applying a voltage to the liquid crystal layer, wherein: linearly polarized light enters the liquid crystal layer and the liquid crystal layer is provided, on a light exit side of the liquid crystal layer, with a polarizing plate transmitting only a component of light having exited from the liquid crystal layer, the component being parallel to the polarization axis of the linearly polarized light having entered the liquid crystal; the liquid crystal layer includes liquid crystal molecules that are tilted, due to voltage application to the liquid crystal layer, in a direction parallel to or perpendicular to the polarization axis of the linearly polarized light having entered the liquid crystal layer; and the electrode is capable of applying two or more different voltages to the liquid crystal layer simultaneously.

According to the above arrangement, it is possible to simultaneously apply two or more different voltages to the liquid crystal layer of the viewing angle controlling liquid crystal panel. This makes it possible to produce, in the liquid crystal layer, two or more areas in each of which the liquid crystal molecules are tilted at a different tilt angle. Accordingly, a difference in retardations in the screen can be reduced. As a result, the viewing angle controlling liquid crystal panel makes it possible to improve uniformity of a shielding effect in the screen. This is explained below.

Generally, when a viewer views a screen of a liquid crystal display device, an optical path length (length of a light ray passing through a liquid crystal layer) varies depending on a position where the viewer views. When liquid crystal molecules are tilted at the same angle in the screen, a birefringence index difference of the liquid crystal molecules also becomes the same. Therefore, a retardation that is a value obtained by multiplying the birefringence index difference by the optical path length varies depending on a position on the screen.

When the retardation in the liquid crystal layer varies depending on a position on the screen, the viewing angle controlling liquid crystal panel appears completely black only in positions of a limited part of the screen. In positions other than the above part, light leakage occurs. As a result, the shielding effect provided by the viewing angle controlling liquid crystal panel becomes ununiform in the screen.

On the other hand, the above arrangement makes it possible to produce, in the liquid crystal layer of the viewing angle controlling liquid crystal panel, areas in each of which the liquid crystal molecules are tilted at a different angle. Since the birefringence index difference of the liquid crystal molecules varies depending on a tilt angle of the liquid crystal molecules, a difference between the optical path lengths each varying depending on a position in the screen can be compensated by adjusting the tilt angle of the liquid crystal molecules. This can reduce a retardation difference in the screen.

As a result, a retardation in the screen can be made closer to a retardation at which the shielding effect of the viewing angle controlling liquid crystal panel is maximized.

Thus, the liquid crystal display device with the above arrangement has an advantageous effect of further improving the uniformity of the shielding effect in the screen by use of the viewing angle controlling liquid crystal panel.

With the above arrangement, due to voltage application, the liquid crystal molecules are tilted in a direction parallel to or perpendicular to a polarization axis of linearly polarized light having entered the liquid crystal layer. Therefore, it is difficult for a viewer in the normal line direction to recognize that different voltages are applied to the liquid crystal layer, even in a case where two or more different voltages are applied to the liquid crystal layer.

This can provide an advantageous effect of preventing deterioration of a display quality in a case where the screen is viewed in the normal line direction.

In the viewing angle controlling liquid crystal panel of the present invention, it is preferable that the electrode is divided into two or more areas so as to be able to apply the two or more different voltages to the liquid crystal layer.

With the above arrangement, it is possible to easily apply two or more different voltages to the liquid crystal layer because the electrode for applying a voltage to the liquid crystal layer is divided into two or more areas.

In the viewing angle controlling liquid crystal panel of the present invention, it is preferable that: the liquid crystal layer is provided with another polarizing plate on a light entrance side of the liquid crystal layer; and the another polarizing plate provided on the light entrance side has a transmission axis parallel to the transmission axis of the polarizing plate provided on the light exit side.

According to the above arrangement, the transmission axis of the polarizing plate provided on the light entrance side of the liquid crystal layer is parallel to or perpendicular to a direction in which the liquid crystal molecules are tilted. Accordingly, it becomes easy to arrange such that linearly polarized light is entered into the liquid crystal layer and a polarization axis of the linearly polarized light having exited from the liquid crystal layer is parallel to the polarization axis of the linearly polarized light having entered the liquid crystal layer.

In the viewing angle controlling liquid crystal panel of the present invention, it is preferable that the transmission axis of the another polarizing plate provided on the light entrance side of the liquid crystal layer is parallel to or perpendicular to a direction in which the liquid crystal molecules are tilted due to voltage application to the liquid crystal layer.

According to the above arrangement, the transmission axis of the polarizing plate provided on the light entrance side of the liquid crystal layer is parallel to the transmission axis of the polarizing plate provided on the light exit side of the liquid crystal layer, and a direction of the transmission axis is parallel to or perpendicular to a direction in which the liquid crystal molecules are tilted due to voltage application to the liquid crystal layer.

Therefore, in a simple structure, it becomes possible to implement a characteristic such that it is difficult to recognize application of different voltages in the normal direction of the viewing angle controlling liquid crystal panel, even in a case where two or more different voltages are applied to the liquid crystal layer as described above.

The viewing angle controlling liquid crystal panel of the present invention can be arranged such that: on a light entrance side of the liquid crystal layer, a wave plate and another polarizing plate are provided in this order from the liquid crystal layer; and by passing of linearly polarized light through the wave plate provided on the light entrance side which linearly polarized light has passed through the another polarizing plate provided on the light entrance side, a polarization axis of the linearly polarized light becomes parallel to or perpendicular to a direction in which the liquid crystal molecules are tilted due to voltage application to the liquid crystal layer.

Further, the viewing angle controlling liquid crystal panel of the present invention may be arranged such that: a wave plate is provided between the polarizing plate provided on the light exit side of the liquid crystal layer and the liquid crystal layer; and by passing of linearly polarized light through the wave plate on the light exit side which linearly polarized light has exited from the liquid crystal layer, a polarization axis of the linearly polarized light becomes parallel to or perpendicular to a transmission axis of the polarizing plate provided on the light exit side.

According to the above arrangement, a direction of the polarization axis of the linearly polarized light can be changed by use of the wave plate. Therefore, even in a case where the transmission axis of the polarizing plate provided on the light entrance side is not parallel to or perpendicular to the direction in which the liquid crystal molecules are tilted at the time of voltage application, the wave plate can make the polarization axis of the linearly polarized light having exited from the polarizing plate on the light entrance side be parallel to or perpendicular to the direction in which the liquid crystal molecules are tilted.

Similarly, in a case where the direction in which the liquid crystal molecules are tilted at the time of voltage application is not parallel to or perpendicular to the transmission axis of the polarizing plate provided on the light exit side, the wave plate can make the polarization axis of the linearly polarized light having exited from the liquid crystal layer become parallel to or perpendicular to the transmission axis of the polarizing plate provided on the light exit side.

Thus, even in a case where a direction of the transmission axis of the polarizing plate is randomly set, it becomes possible to implement a characteristic such that it is difficult to recognize application of different voltages to the liquid crystal layer in the normal direction of the viewing angle controlling liquid crystal panel. As a result, a degree of freedom in designing the viewing angle controlling liquid crystal panel is increased.

In the viewing angle controlling liquid crystal panel of the present invention, the liquid crystal molecules are arranged preferably in any one of homogeneous alignment, homeotropic alignment, hybrid alignment of homogeneous alignment and homeotropic alignment, splay alignment, and bend alignment.

According to the above arrangement, no twisted component or few twisted components is contained in alignment of the liquid crystal molecules. In other words, the liquid crystal molecules are not in twisted alignment. This easily allows the polarization axis of the linearly polarized light having entered the liquid crystal layer to be parallel to the polarization axis of the linearly polarized light having exited from the liquid crystal layer.

Further, it becomes difficult that the liquid crystal molecules are tilted in directions other than a thickness direction of the liquid crystal layer. Further, the direction in which the liquid crystal molecules are tilted due to voltage application can be easily made parallel to or perpendicular to the polarization axis of the linearly polarized light having entered the liquid crystal layer.

In the viewing angle controlling liquid crystal panel of the present invention, it is preferable that the two or more areas into which the electrode is divided partially overlap with each other via an insulating layer so that no gap is produced between the two or more areas of the electrode in a plane view.

According to the above arrangement, the electrode for applying a voltage to the liquid crystal layer has no gap. Accordingly, a gap in shielding is hard to occur when the screen is viewed in the oblique direction.

In order to solve the problem mentioned above, a display device of the present invention includes the viewing angle controlling liquid crystal panel and a display panel. Further, in the display device of the present invention, it is preferable that the display panel is a liquid crystal panel.

BRIEF DESCRIPTION OF DRAWINGS

FIG. 1 illustrates an embodiment of the present invention and is a diagram illustrating an electrode wiring pattern of a viewing angle controlling liquid crystal panel.

FIG. 2 is a diagram illustrating a scene where a viewer views two different positions on a liquid crystal display device

FIG. 3 is a cross sectional view of the viewing angle controlling liquid crystal panel. (a) of FIG. 3 illustrates a cross section taken from a line A-A in FIG. 1 and shows an orientation state of first liquid crystal molecules at the time when no voltage is applied. (b) of FIG. 3 illustrates a cross taken from the line A-A in FIG. 1 and shows an orientation state of the first liquid crystal molecules at the time when a voltage is applied. (c) of FIG. 3 illustrates a cross section taken from a line B-B in FIG. 1 and shows an orientation state of the first liquid crystal molecules 17 at the time when a voltage is applied.

FIG. 4 illustrates another embodiment of the present invention and is a diagram illustrating an electrode wiring pattern of a viewing angle controlling liquid crystal panel.

FIG. 5 illustrates still another embodiment of the present invention and is a diagram illustrating an electrode wiring pattern of a viewing angle controlling liquid crystal panel.

FIG. 6 is a cross sectional view of the viewing angle controlling liquid crystal panel. (a) of FIG. 6 illustrates a cross section taken from a line C-C in FIG. 5. (b) of FIG. 6 illustrates another example of a cross section of a first lower substrate which is equivalent to the cross section taken from the line C-C in FIG. 5.

FIG. 7 illustrates yet another embodiment of the present invention and is a diagram illustrating an electrode wiring pattern of a viewing angle controlling liquid crystal panel.

FIG. 8 is a cross sectional view of the viewing angle controlling liquid crystal panel. (a) of FIG. 8 illustrates a cross section taken from a line D-D in FIG. 7. (b) of FIG. 8 illustrates another example of a cross section of a first lower substrate which is equivalent to the cross section taken from the line D-D in FIG. 7.

FIG. 9 is a cross sectional view illustrating an arrangement of a liquid crystal device including a viewing angle controlling liquid crystal panel and a liquid crystal display panel.

FIG. 10 is a diagram illustrating how liquid crystal molecules are seen by viewers. (a) of FIG. 10 illustrates how the liquid crystal molecules are seen by the viewers when no voltage is applied to the liquid crystal molecules in the viewing angle controlling liquid crystal panel. (b) of FIG. 10 is a diagram illustrating how the liquid crystal molecules are seen by the viewers when a voltage is applied to the liquid crystal molecules in the viewing angle controlling liquid crystal panel.

FIG. 11 is a diagram illustrating a scene where a viewer views three different positions on the liquid crystal display device.

FIG. 12 is a diagram illustrating a liquid crystal structure described in Patent Literature 1.

REFERENCE SIGNS LIST

Figure 1:
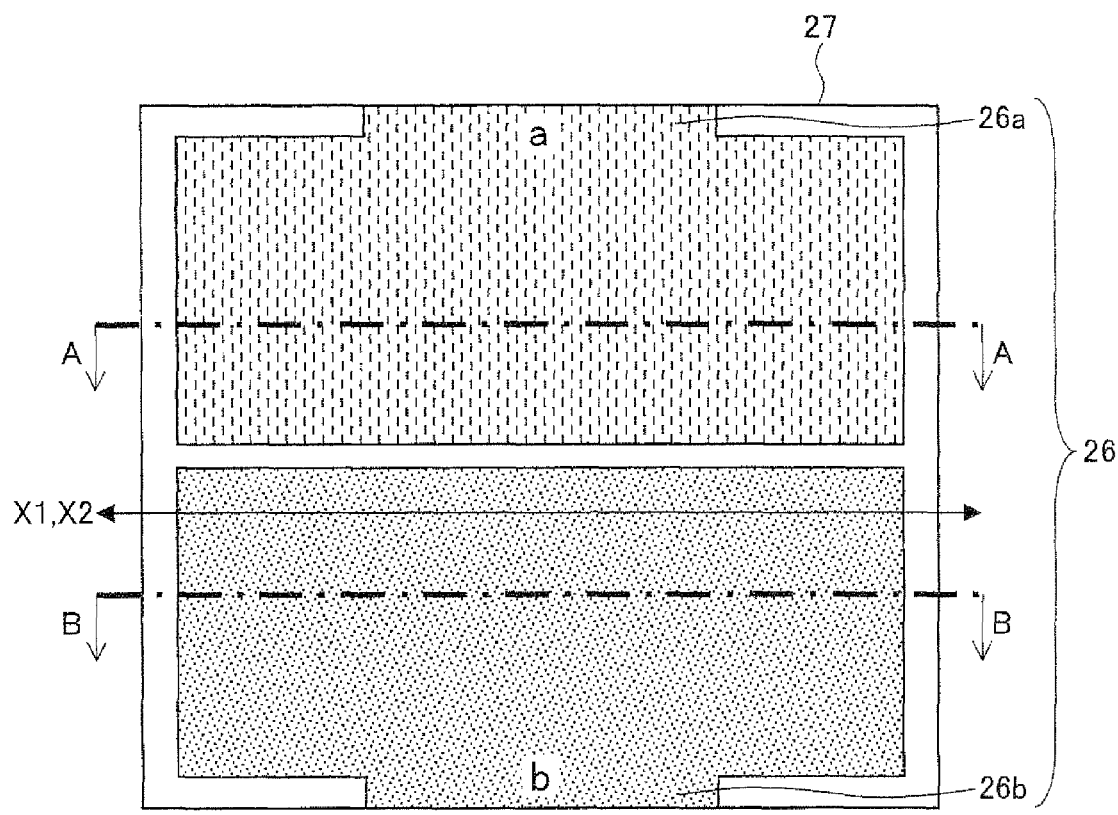
FIG. 1
Figure 1:

1 Liquid crystal display device (display device)
5 Viewing angle controlling liquid crystal panel
6 Liquid crystal display panel (display panel)
7 Backlight
10 First liquid crystal cell
11 Second liquid crystal cell
15 First liquid crystal layer
16 Second liquid crystal layer
17 First liquid crystal molecules
20 First upper polarizing plate
21 First upper wave plate
22 First upper substrate
23 First upper electrode
24 First upper alignment film
25 First lower alignment film
26 First lower electrode
27 First lower substrate
28 First lower wave plate
29 First lower polarizing plate
30 Second upper polarizing plate
31 Second upper wave plate
32 Second upper substrate
33 Second upper electrode
34 Second upper alignment film
35 Second lower alignment film
36 Second lower electrode
37 Second lower substrate
38 Second lower wave plate
39 Second lower polarizing plate
40 Transparent insulating film
50 Screen

DESCRIPTION OF EMBODIMENTS

Embodiment 1

Figure 2:
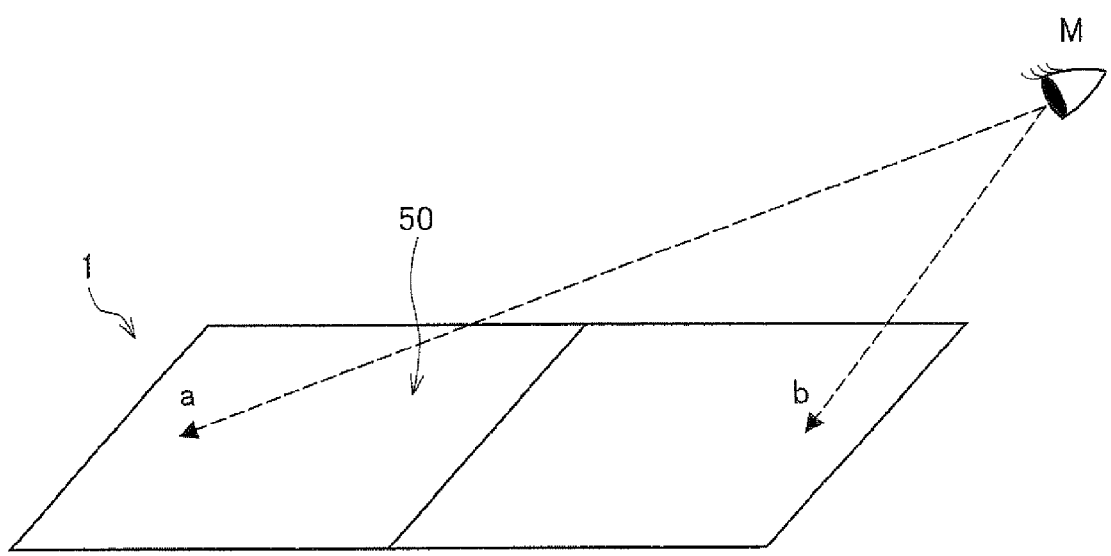
FIG. 2
Figure 3:
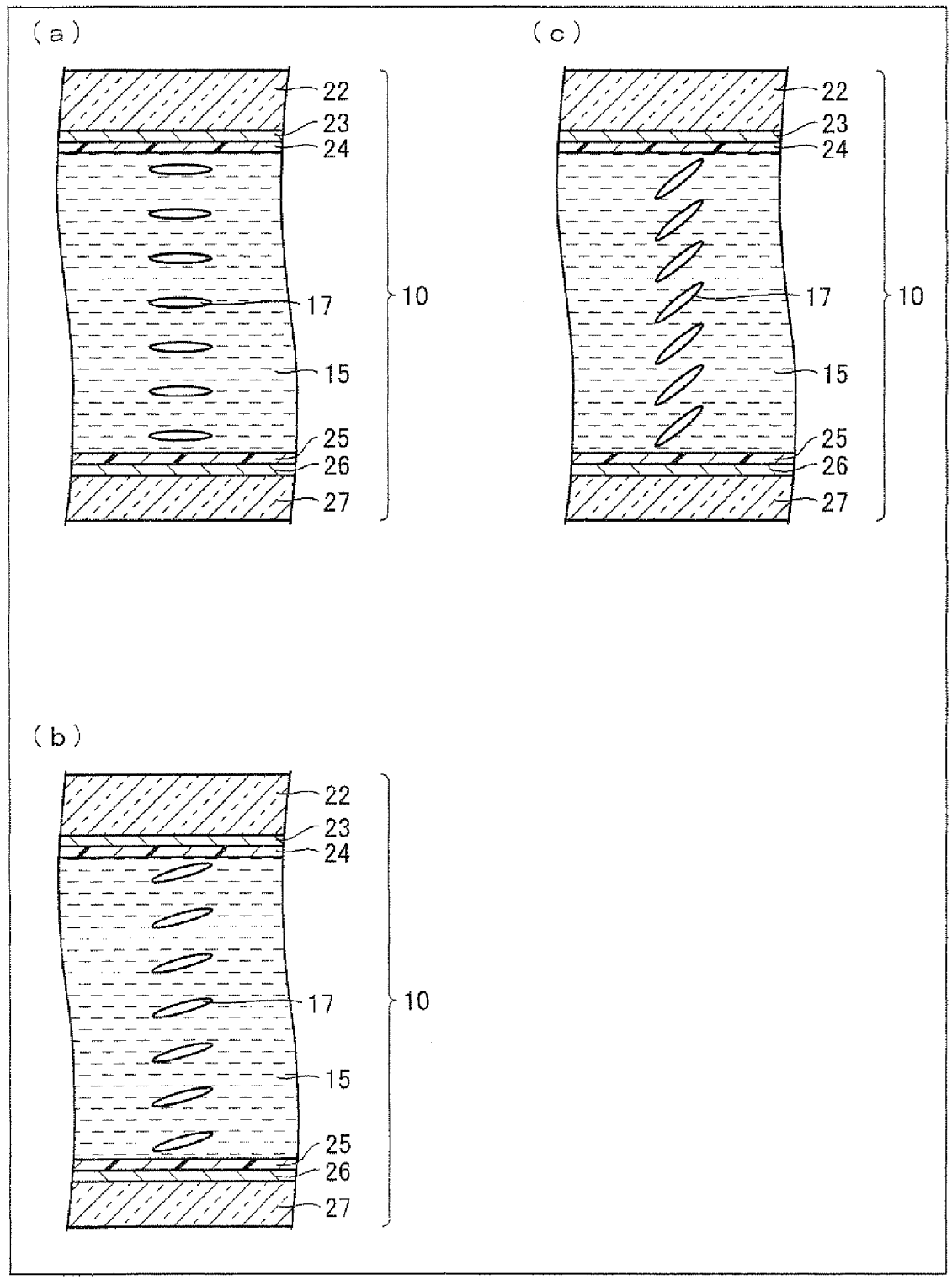
FIG. 3

The following explains an embodiment of the present invention with reference to FIG. 1 through FIG. 3, showing as an example a liquid crystal display device 1 including a liquid crystal display panel 6 as a display panel.

(Cross Section Arrangement)

Figure 9:
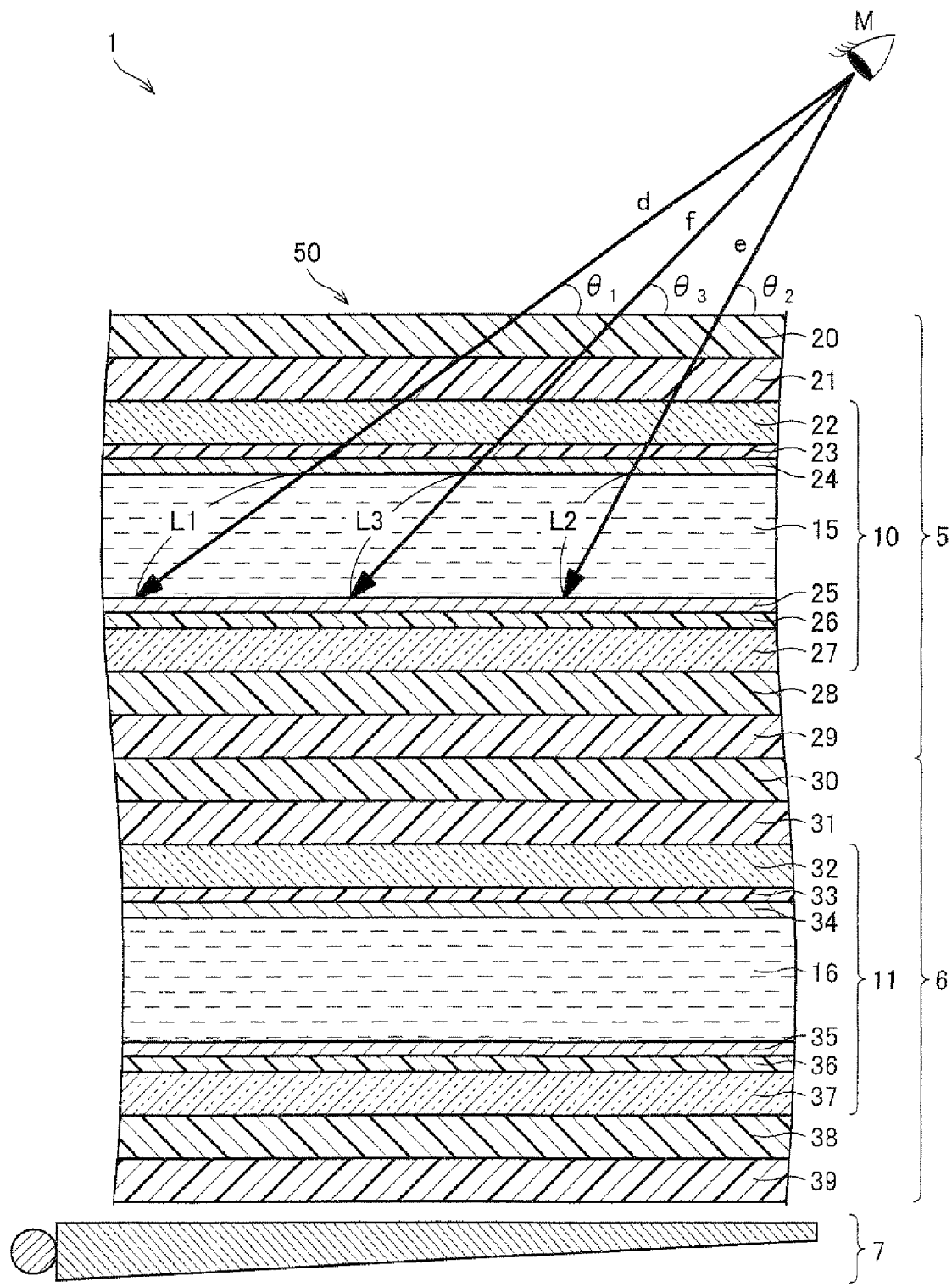
FIG. 9
Figure 10:
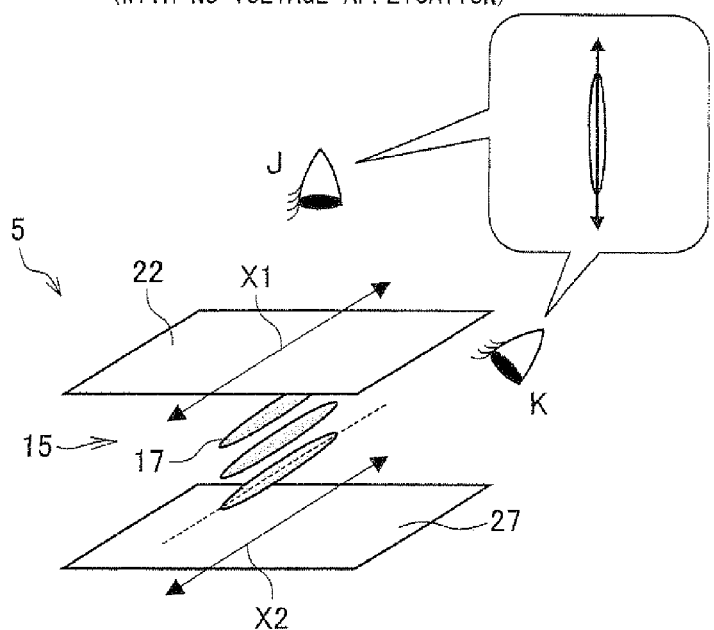
FIG. 10
Figure 10:
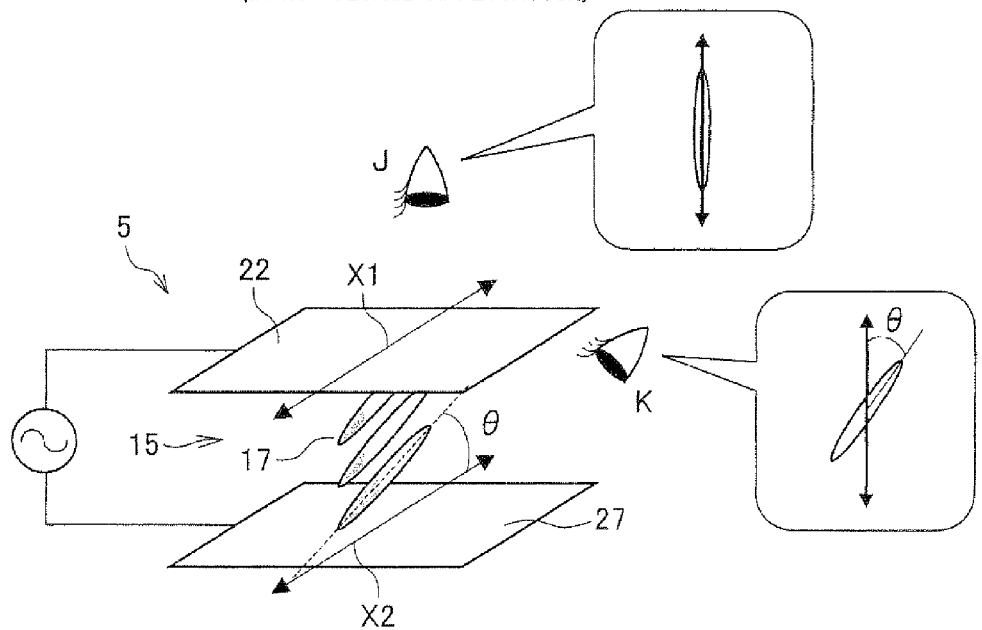

A schematic arrangement of the liquid crystal display device 1 of the present embodiment is substantially the same as an arrangement of a liquid crystal display device explained with reference to FIG. 9. Schematically, the liquid crystal display device 1 includes a viewing angle controlling liquid crystal panel 5, a liquid crystal display panel 6, and a backlight 7. Each of the viewing angle controlling liquid crystal panel 5 and the liquid crystal display panel 6 has the same arrangement as an arrangement of a typical liquid crystal panel. Namely, a liquid crystal layer (a first liquid crystal layer 15 or a second liquid crystal layer 16) is sandwiched between substrates (a first upper substrate 22 and a first lower substrate 27, or a second upper substrate 32 and a second lower substrate 37). Each of the substrates above is provided, on an outer surface of each of the substrates, with a wave plate and a polarizing plate (a first upper wave plate 21 and a first upper polarizing plate 20, a first lower wave plate 28 and a first lower polarizing plate 29, a second upper wave plate 31 and a second upper polarizing plate 30, or a second lower wave plate 38 and a second lower polarizing plate 39).

(Electrode Arrangement)

In the liquid crystal display device 1 of the present embodiment, a first lower electrode 26 of the viewing angle controlling liquid crystal panel 5 is provided as a patterned electrode, unlike an overall electrode of a conventional screen 50 which covers an entire surface of the screen 50. This arrangement allows applying two or more different voltages to the first liquid crystal layer 15. The following provides an explanation with reference to FIGS. 1 and 2.

FIG. 1 illustrates a present embodiment and is a diagram illustrating an electrode wiring pattern of a viewing angle controlling liquid crystal panel. FIG. 2 is a diagram illustrating a scene where a viewer M views two different positions on the liquid crystal display device 1.

As illustrated in FIG. 1, in the viewing angle controlling liquid crystal panel 5 according to the present embodiment, the first lower electrode 26 is formed into a pattern including two divisional sections. Namely, the first lower electrode 26 is divided into two, that is, a first lower electrode 26a provided in a far position of the screen ("a" in FIG. 1 that is the same as "a" in FIG. 2) and a first lower electrode 26b provided in a near position of the screen ("b" in FIG. 1 that is the same as "b" in FIG. 2). Further, these first lower electrodes 26a and 26b are arranged such that different voltages can be applied to the first lower electrodes 26a and 26b, respectively. Specifically, the first lower electrode 26 is divided into the first lower electrodes 26a and 26b along a line which is substantially parallel to a side of the first lower substrate 27 and which divides, in the vicinity of a center of the first lower substrate 27, the first lower substrate 27 into two equal sections.

(Orientation of Liquid Crystal)

The following explains orientation of liquid crystal molecules 17 in the viewing angle controlling liquid crystal panel 5 according to the present embodiment. Firstly, orientation of the first liquid crystal molecules 17 at the time when no voltage is applied is explained with reference to (a) of FIG. 3. (a) of FIG. 3 is a cross sectional view taken from a line A-A in FIG. 1 and illustrates orientation of the first liquid crystal molecules 17 at the time when no voltage is applied to the first liquid crystal layer 15 (in the case of a wide viewing angle).

As illustrated in (a) of FIG. 3, the first liquid crystal molecules 17 in the viewing angle controlling liquid crystal panel 5 according to the present embodiment are in homogeneous alignment in which the first liquid crystal molecules 17 are parallel to the first upper substrate 22 and the first lower substrate 27. (a) of FIG. 3 is a cross sectional view taken from the line A-A in FIG. 1 in an area including a position "a" (see FIGS. 1 and 2). When no voltage is applied, orientation of the first liquid crystal molecules 17 is the same in the area including the position "a" and an area including a position "b". Namely, when no voltage is applied, the cross sectional view taken from the line A-A in FIG. 1 and a cross sectional view taken from a line B-B in FIG. 1 are identical.

(Polarizing Plate)

Next, the following explains directions of respective transmission axes of polarizing plates, that is, the first upper polarizing plate 20 and the first lower polarizing plate 29, in the viewing angle controlling liquid crystal panel 5 according to the present embodiment. An arrow X1 in FIG. 1 shows a transmission axis of the first upper polarizing plate 20, and an arrow X2 in FIG. 1 shows a transmission axis of the first lower polarizing plate 29.

As illustrated in FIG. 1, the first upper polarizing plate 20 and the first lower polarizing plate 29 are provided such that the transmission axis X1 of the first upper polarizing plate 20 becomes parallel to the transmission axis X2 of the first lower polarizing plate 29.

Further, the first upper polarizing plate 20 and the first lower polarizing plate 29 are arranged such that the transmission axis X1 of the first upper polarizing plate 20 and the transmission axis X2 of the first lower polarizing plate 29 are parallel to a direction of long axes of the first liquid crystal molecules 17 in homogeneous alignment (Viewing Angle Control)

Next, the following explains viewing angle control, that is, switching between a wide viewing angle and a narrow viewing angle, in the liquid crystal display device 1 according to the present embodiment.

The wide viewing angle and the narrow viewing angle is switched by on-off operation of voltage application to the first liquid crystal layer 15 of the viewing angle controlling liquid crystal panel 5 (more specifically, the first liquid crystal molecules 17 in the first liquid crystal layer 15). Namely, when the liquid crystal display device 1 is to be used for wide viewing angle use, no voltage is applied to the first liquid crystal layer 15 of the viewing angle controlling liquid crystal panel 5. Meanwhile, when the liquid crystal display device 1 is used for narrow viewing angle use, a voltage is applied to the first liquid crystal layer 15 of the viewing angle controlling liquid crystal panel 5.

(In Wide Viewing Angle Use)

The following explains the wide viewing angle use. In a case of the wide viewing angle use, no voltage is applied to the first liquid crystal layer 15. Therefore, as illustrated in (a) of FIG. 3, the first liquid crystal molecules 17 are in homogeneous alignment. Further, a direction of the long axes of the first liquid crystal molecules 17 are parallel to the transmission axis X1 of the first upper polarizing plate 20 and the transmission axis X2 of the first lower polarizing plate 29.

This allows the viewing angle controlling liquid crystal panel 5 to appear transparent in each of a normal line direction and an oblique direction. As a result, it is possible to see an image displayed in the liquid crystal display panel 6 which is provided behind the viewing angle controlling liquid crystal panel 5

(In Narrow Viewing Angle Use)

Next, the following explains the narrow viewing angle use. In the case of the narrow viewing angle use, a voltage is applied to the first liquid crystal layer 15.

The viewing angle controlling liquid crystal panel 5 according to the present embodiment is characterized in that a different voltage is applied to each of the first lower electrode 26a and 26b. In the present embodiment, it is possible to apply a different voltage to each of the first lower electrode 26a and the first lower electrode 26b. Accordingly, in the first liquid crystal layer 15, (i) orientation of the first liquid crystal molecules 17 in an area (area "a") to which the first lower electrode 26a applies a voltage can be made different from (ii) orientation of the liquid crystal molecules 17 in an area (area "b") to which the first lower electrode 26b applies a voltage. In other words, a tilt of the first liquid crystal molecules 17 in the area "a" including the position "a" that is a far position of the screen 50 can be made different from a tilt of the first liquid crystal molecules 17 in the area "b" including the position "b" that is a near position of the screen 50.

The following provides an explanation with reference to (b) of FIG. 3 and (c) of FIG. 3.

(b) of FIG. 3 is a cross sectional view taken from the line A-A in FIG. 1 and illustrates an orientation state of the first liquid crystal molecules 17 in the area "a" at the time when a voltage is applied to the first liquid crystal layer 15 (in the narrow viewing angle use). (c) of FIG. 3 is a cross sectional view taken from the line B-B in FIG. 1 and illustrates an orientation state of the first liquid crystal molecules 17 in the area "b" at the time when a voltage is applied to the first liquid crystal layer 15 (in the narrow viewing angle use).

As illustrated in (b) of FIG. 3 and (c) of FIG. 3, the first liquid crystal molecules 17 having been in homogeneous alignment become tilted in a thickness direction of the first liquid crystal layer 15 in both of the areas "a" and "b", when a voltage is applied.

In the present embodiment, a voltage applied to the first lower electrode 26a corresponding to the area "a" is lower than a voltage applied to the first lower electrode 26b corresponding to the area "b". This makes the first liquid crystal molecules 17 in the area "a" less tilted due to the voltage application than the first liquid crystal molecules 17 in the area "b".

(Oblique Direction)

It is possible to improve uniformity of a shielding effect by producing, in the liquid crystal layer 15, areas in each of which a tilt of the first liquid crystal molecules 17 is different. This is explained below.

First, the following explains cases where a screen is viewed in oblique directions, with reference FIG. 1 and FIG. 2.

Figure 11:
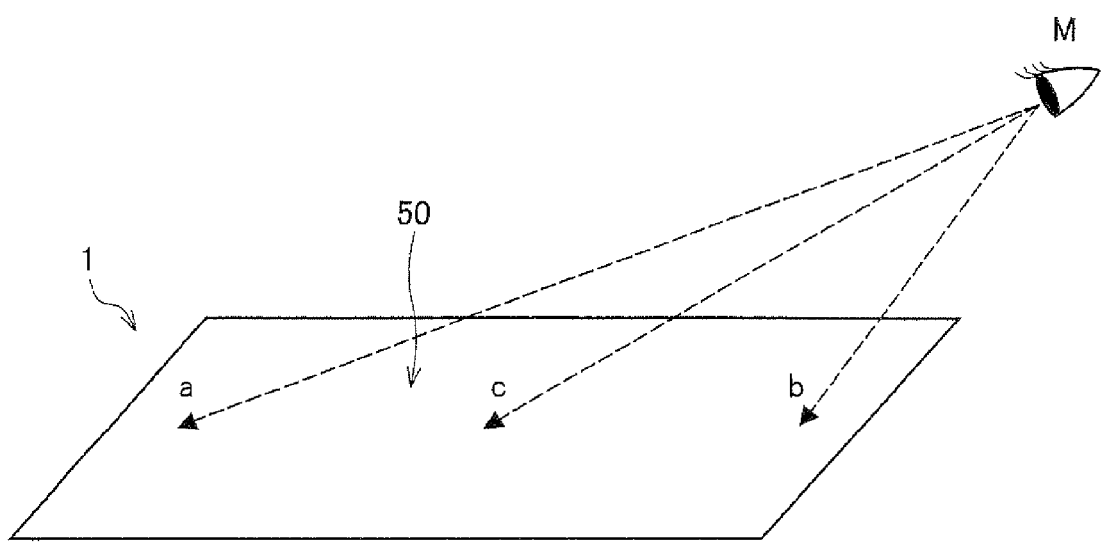
FIG. 11
Figure 12:
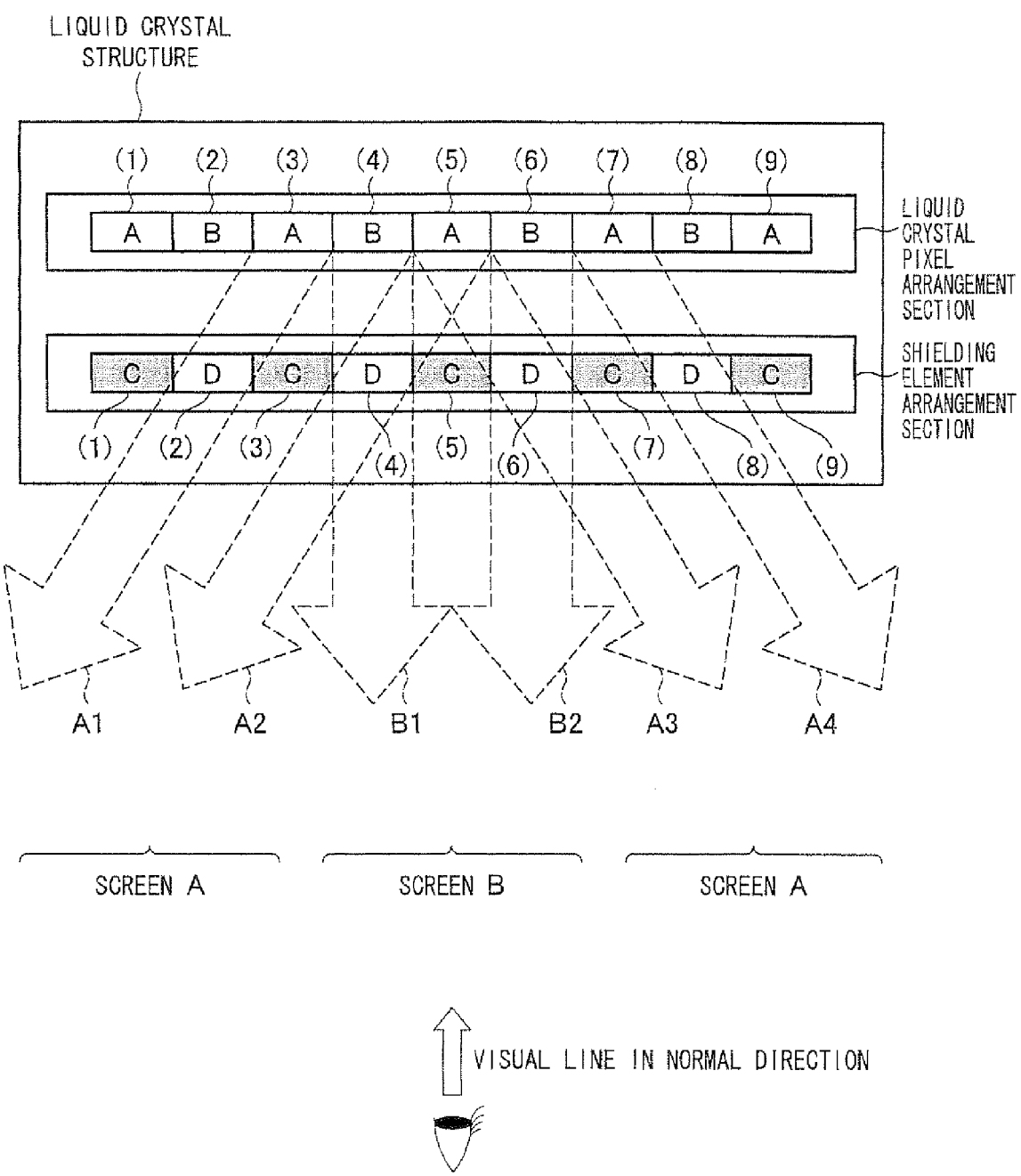
FIG. 12

As described with reference to FIGS. 9 and 11, an optical path length in a case where a viewer M views a position "a" on the screen is longer than an optical path length in a case the viewer M views a position "b" on the screen. Therefore, in a case where the first liquid crystal molecules 17 are in an identical orientation state in both areas "a" and "b" of the first liquid crystal layer 15, the viewing angle controlling liquid crystal panel 5 has different retardations in the areas "a" and "b". Specifically, the retardation in the area "a" is larger than the retardation in the area "b".

However, in the viewing angle controlling liquid crystal panel 5 of the present embodiment, tilts of the first liquid crystal molecules 17 are varied between the areas "a" and "b". A difference in the tilts of the first liquid crystal molecules 17 allows compensation of the difference in the optical path lengths. As a result, it is possible to reduce a difference in the retardations of the areas "a" and "b". The retardation of the liquid crystal layer is obtained by multiplying a difference (birefringence index difference) between a refractive index of a slow axis and a refractive index of a fast axis by a length of a ray of light passing through the liquid crystal layer (optical path length), and the birefringence index difference can be varied by differently tilting the first liquid crystal molecules 17. This allows the difference in the optical path lengths to be compensated.

More specifically, the first liquid crystal molecules 17 in the area "a" where the optical path length is long are tilted at a smaller degree than a degree at which the first liquid crystal molecules 17 are tilted in the area "b" where the optical path length is short. This reduces the birefringence index difference. As a result, the longer optical path length is compensated so that the retardation in the area "a" becomes closer to the retardation in the area "b".

This can reduce a difference between a retardation at the time when a far position ("a" in FIG. 2) on the screen 50 is viewed and a retardation at the time when a near position ("b" in FIG. 2) on the screen 50 is viewed, even in a case where, for example, the viewing angle controlling liquid crystal panel 5 is designed to appear completely black at the time when a viewer views the near position ("b" in FIG. 2) on the screen 50. This makes it possible in a case where the viewer views the far position ("a" in FIG. 2) on the screen 50, to implement the same shielding effect as in a case where the viewer views the far position ("a" in FIG. 2) on the screen 50.

In other words, in the viewing angle controlling liquid crystal panel 5 according to the present embodiment, a voltage to optimally make the area non-transmissive is applied to the first lower electrode 26a in the area "a" whereas a voltage to optimally make the area b non-transmissive is applied to the first lower electrode 26b in the area "b". This voltage applied to the first lower electrode 26b is different from the voltage applied to the first lower electrode 26a. Consequently, a non-transmissive section is always produced in each of the areas. As a result, it is possible to further prevent leakage of image information displayed on the liquid crystal display panel 6.

As described above, unlike a conventional viewing angle controlling liquid crystal panel 5, the viewing angle controlling liquid crystal panel 5 according to the present embodiment can produce different retardations within the screen. This makes it possible to implement a more uniform and even black display and shielding.

(Normal Line Direction)

The following explains a case where a screen is viewed in the normal line direction.

In a case where a plurality of areas of different orientation states are provided in the first liquid crystal layer 15 and the plurality of areas are recognizable at the time when the plurality of areas are viewed in the normal direction, a display quality deteriorates. In this regard, in the viewing angle controlling liquid crystal panel 5 according to the present embodiment, it is difficult to recognize the plurality of areas in the normal direction. This is explained below.

In the viewing angle controlling liquid crystal panel 5 according to the present embodiment, the first liquid crystal molecules 17 are in homogeneous alignment as described above, and the direction of the long axes of the liquid crystal molecules 17 is parallel to the transmission axis X1 of the first upper polarizing plate 20 and the transmission axis X2 of the first lower polarizing plate 29. In addition, when a voltage is applied, the first liquid crystal molecules 17 are tilted only in the thickness direction of the first liquid crystal layer 15 but are not tilted (rotated) in a direction parallel to the first upper substrate 22 and the first lower substrate 27.

Therefore, in a case where a different voltage is applied to each of the first lower electrodes 26a and 26b so that tilt angles of the liquid crystal molecules 17 are different between the area "a" and the area "b", both of the areas become transparent. This makes it difficult to recognize a difference between the areas.

Thus, in a case where the screen is viewed in the normal direction, it is difficult to recognize that the first lower electrode 26 is divided into the areas "a" and "b". This can prevent deterioration in the display quality caused by dividing the first lower electrode 26 into a plurality of areas. Note that, in the normal line direction, the viewing angle controlling liquid crystal panel 5 appears transparent when a voltage is applied. Accordingly, as in the case where no voltage is applied, an image displayed in the liquid crystal display panel 6 provided behind the viewing angle controlling liquid crystal panel 5 can be viewed.

The present invention is not limited to the above arrangement and various modifications are possible. For example, the pattern formation of the first lower electrode 26 is not limited to the above arrangement, as long as different voltages can be applied to at least two areas in the screen 50 of the first liquid crystal layer 15. The arrangement may be, for example, an arrangement where the first upper electrode 23 is formed into a pattern and the first lower electrode 26 is arranged to be an overall electrode, or an arrangement where both of the first upper electrode 23 and the first lower electrode 26 are formed into respective patterns.

Further, in the above explanation, the first liquid crystal molecules 17 in homogeneous alignment is used as an example. However, the present invention is not limited to homogeneous alignment. The first liquid crystal molecules 17 may be in, for example, homeotropic alignment, hybrid alignment (hybrid of homogeneous alignment and homeotropic alignment), splay alignment, or bend alignment. As long as a direction in which the first liquid crystal molecules 17 are tilted according to voltage application is (i) parallel or perpendicular to the first upper polarizing plate 20 and the first lower polarizing plate 29 or (ii) parallel or perpendicular to incoming/outgoing light into/from the first liquid crystal layer 15, it is possible to make it difficult to recognize the pattern provided in the first lower electrode 26 regardless of voltage application as described above in a case where the liquid crystal display device 1 is viewed in the normal direction.

In the above explanation, the viewing angle controlling liquid crystal panel 5 is provided on a front side of the liquid crystal display panel 6 (on an opposite side with respect to the backlight). However, the arrangement is not limited to this. For example, the viewing angle controlling liquid crystal panel 5 may be provided behind the liquid crystal display panel 6 (between the liquid crystal display panel 6 and the backlight). However, in view of further improving a shielding effect by use of the viewing angle controlling liquid crystal panel 5, it is preferable to provide the viewing angle controlling liquid crystal panel 5 on the front side of the liquid crystal display panel 6.

Further, the explanation above describes the arrangement including the wave plates (the first upper wave plate 21 and the first lower wave plate 28). However, the arrangement is not limited to this and the wave plate may not necessarily be provided. Note that, in a case where no wave plate is provided, a direction of the tilt of the first liquid crystal molecules 17 that are viewed in the normal line direction is preferably parallel to or perpendicular to the transmission axis of the polarizing plate. Further, the transmission axis of the first upper polarizing plate 20 provided in the viewing angle controlling liquid crystal panel 5 is preferably parallel to the transmission axis of the first lower polarizing plate 29.

The number of the electrodes provided as a result of pattern formation (electrodes produced by dividing the first lower electrode 26) is not limited to two. The scope of the present invention encompasses any case where two or more different voltages are applied to the first liquid crystal layer 15 by inputting a plurality of signals into a single substrate (either of or both of the first upper substrate and the first lower substrate).

Further, in the above explanation, a liquid crystal panel (liquid crystal display panel 6) is used as a display panel. However, a type of the display panel is not specifically limited to the display panel above. Various types of panels such as a plasma display panel or an EL (Electro luminescence) display panel can be used as the display panel.

Embodiment 2

Figure 4:
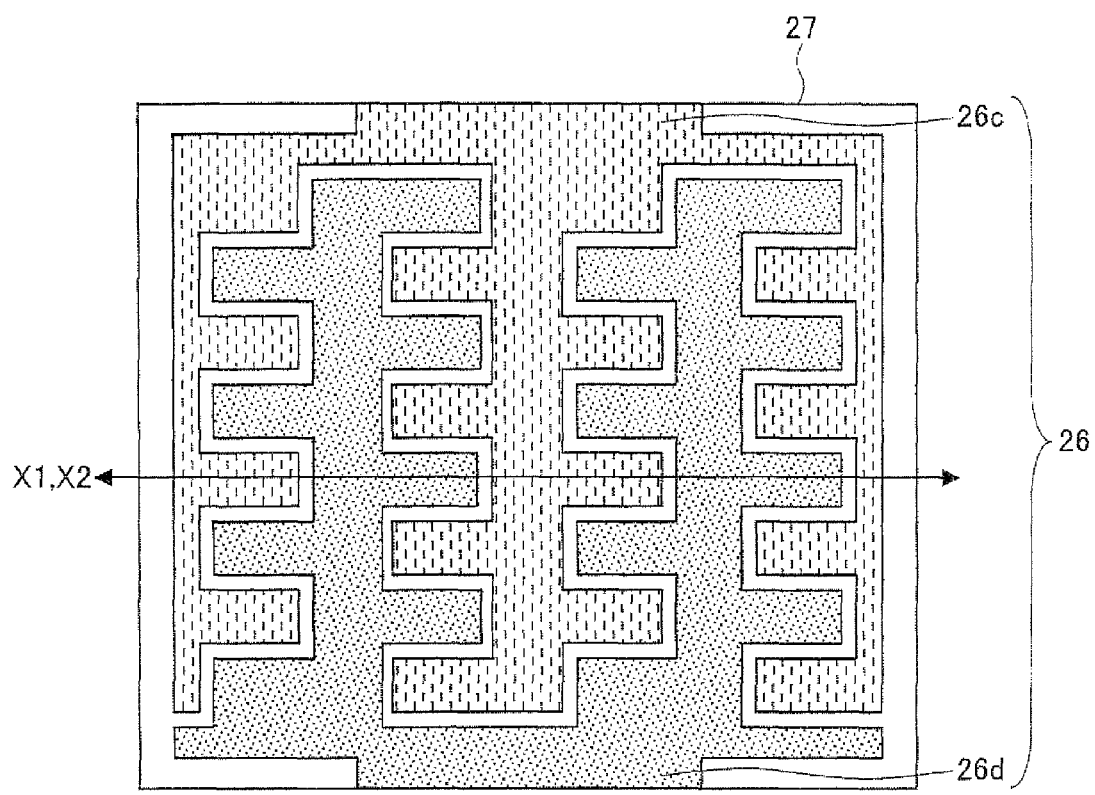
FIG. 4

The following explains another embodiment of the present invention with reference to FIG. 4. FIG. 4 illustrates another embodiment of the present invention and is a diagram illustrating an electrode wiring pattern of a viewing angle controlling liquid crystal panel.

Note that an arrangement other than an arrangement explained in the present embodiment is the same as an arrangement in Embodiment 1. For convenience of explanation, members that have identical functions to those of members described in Embodiment 1 are given the same reference signs, and the explanations thereof are omitted.

In a viewing angle controlling liquid crystal panel 5 according to the present embodiment, a pattern for dividing a first lower electrode 26 is different from a pattern in Embodiment 1. In other words, whereas, in Embodiment 1, due to the pattern for dividing the first lower electrode 26, the first lower electrode 26 is divided into two equal sections along a line in the vicinity of a center of a pixel as a boundary, the first lower electrode 26 in the present embodiment has a comb-teeth pattern as illustrated in FIG. 4.

Specifically, each of two first lower electrodes 26 (a first lower electrode 26c and a first lower electrode 26d) has a comb-teeth shape. Comb-teeth of one electrode is arranged so as to be engaged with comb-teeth of the other electrode. Each of the comb-teeth of the electrodes has short branches in a direction perpendicular to a direction in which the comb teeth extend.

As a result of dividing the first lower electrode 26 into the shape as described above, in consideration of scenes where the liquid crystal display device is viewed not only in a anteroposterior direction and a right-left direction but also in various directions, it is possible to set an application voltage appropriate for each scene. This can further improve the uniformity of the shielding effect in the screen.

Embodiment 3

Figure 5:
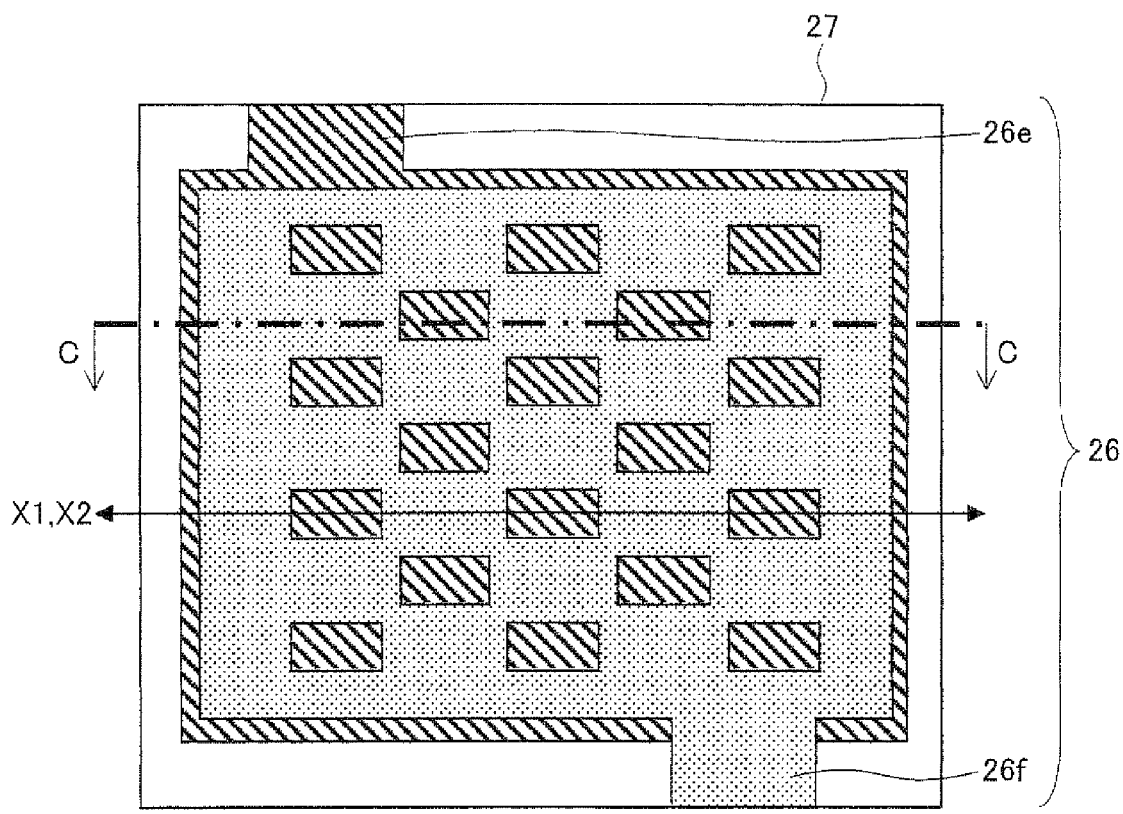
FIG. 5
Figure 6:
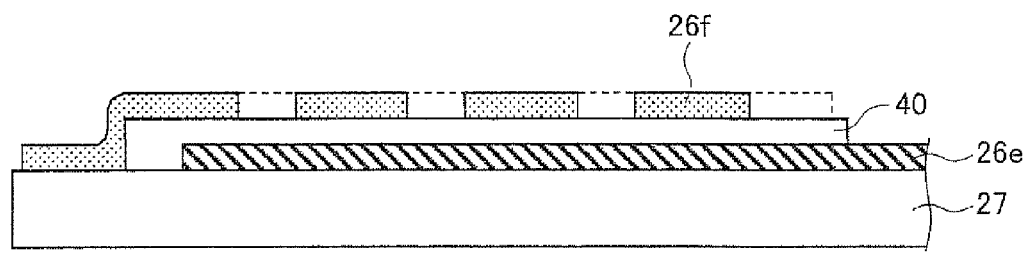
FIG. 6
Figure 6:
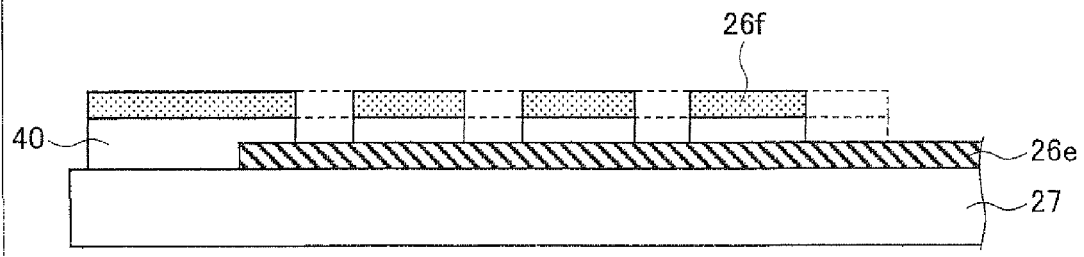

The following explains still another embodiment of the present invention with reference to FIG. 5, (a) of FIG. 6, and (b) of FIG. 6. FIG. 5 illustrates still another embodiment of the present invention and is a diagram illustrating an electrode wiring pattern of the viewing angle controlling liquid crystal panel. (a) of FIG. 6 is a cross sectional view taken from a line C-C in FIG. 5. Further, (b) of FIG. 6 illustrates another example of a cross section of the first lower substrate. (b) of FIG. 6 is a cross sectional view equivalent to the cross sectional view taken from the line C-C in FIG. 5.

Note that an arrangement other than an arrangement explained in the present embodiment is the same as arrangements in the above embodiments. For convenience of explanation, members that have identical functions to those of the members in the embodiments described above are given the same reference signs and explanations thereof are omitted.

The viewing angle controlling liquid crystal panel 5 according to the present embodiment is characterized in that an overlap section is provided to each section into which a first lower electrode 26 is divided so that there occurs no gap in shielding against a view in an oblique direction. Specifically, a transparent insulating film 40 is provided between two first lower electrodes 26 (a first lower electrode 26e and a first lower electrode 26f) and each overlap section between the first lower electrode 26e and the first lower electrode 26f is provided. The following explains this arrangement.

As illustrated in FIG. 5, the viewing angle controlling liquid crystal panel 5 of the present embodiment includes the first lower electrode 26e and the first lower electrode 26f to each of which a voltage can be individually applied.

Specifically, as illustrated in (a) of FIG. 6 and (b) of FIG. 6, the first lower electrode 26e that is an overall electrode is provided on a first lower substrate 27 so as to cover an entire area of a screen. Above this first lower electrode 26e, the first lower electrode 26f is provided via the transparent insulating film 40.

The first lower electrode 26f has rectangular cut sections. Through the rectangular cut sections, the first lower electrode 26e is exposed. This prevents a gap in the first lower electrode 26 in a plane view, even in a case where a pattern is formed in the first lower electrode 26.

As described above, since there is no gap in the first lower electrodes 26, the viewing angle controlling liquid crystal panel 5 of the present embodiment has no gap in shielding when viewed in an oblique direction.

According to an arrangement illustrated in (a) of FIG. 6, the transparent insulating film 40 is provided on the first lower electrode 26e which is exposed through the rectangular cut sections of the first lower electrode 26f. However, the arrangement is not limited to this. For example, as illustrated in (b) of FIG. 6, the first lower electrode 26e may be directly exposed not via the transparent insulating film.

Embodiment 4

Figure 7:
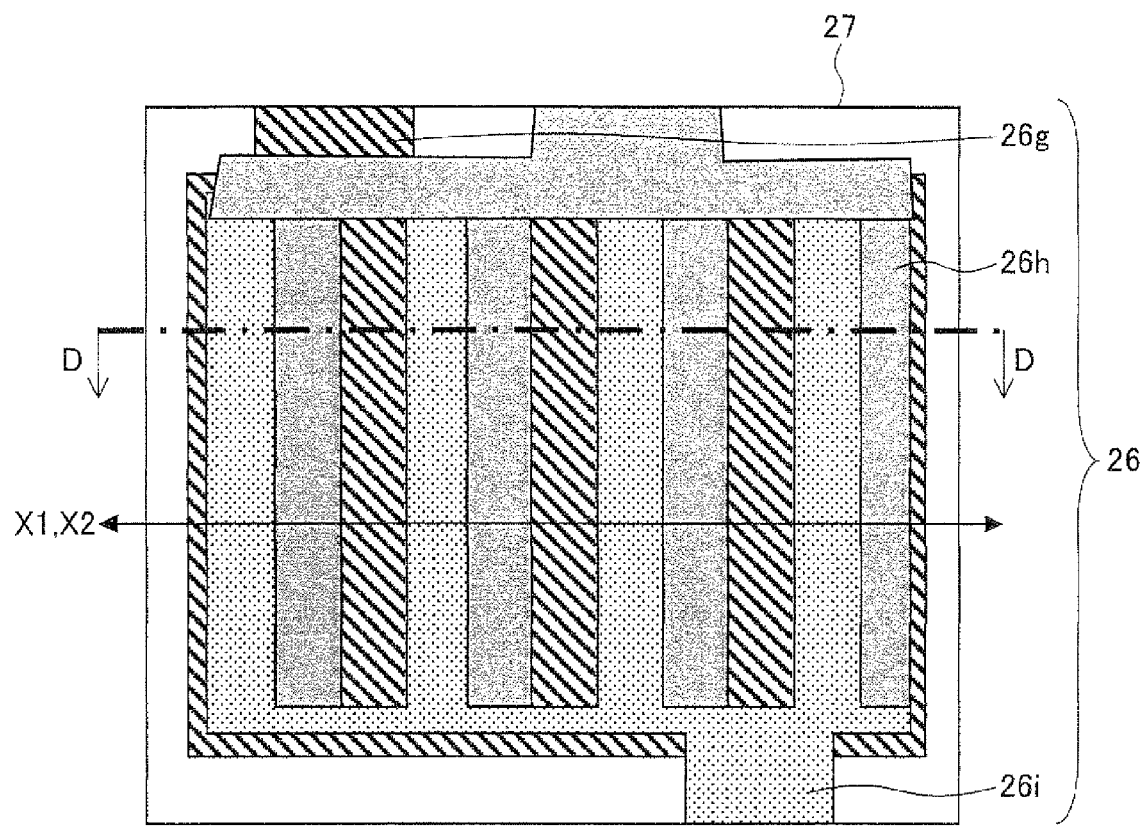
FIG. 7
Figure 8:
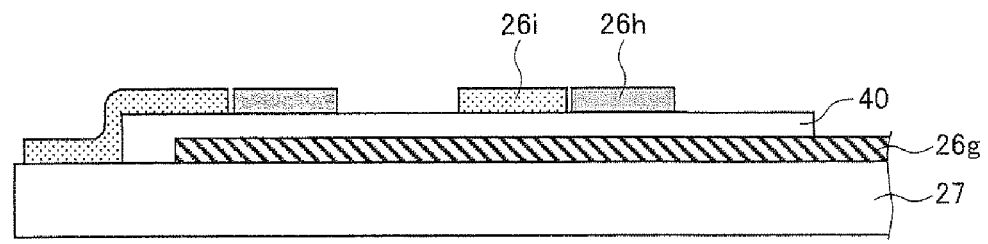
FIG. 8
Figure 8:
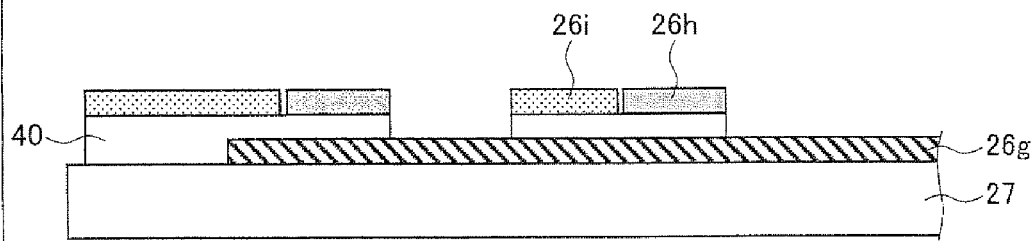

The following explains yet another embodiment of the present invention with reference to FIG. 7, (a) of FIG. 8, and (b) of FIG. 8. FIG. 7 illustrates yet another embodiment of the present invention and is a diagram illustrating an electrode wiring pattern of the viewing angle controlling liquid crystal panel. (a) of FIG. 8 is a cross sectional view taken from a line C-C in FIG. 7. (b) of FIG. 8 illustrates another example of a cross section of the first lower substrate. (b) of FIG. 8 is a cross sectional view equivalent to the cross sectional view taken from the line C-C in FIG. 7.

Note that an arrangement other than an arrangement explained in the present embodiment is the same as arrangements in the above embodiments. For convenience of explanation, members that have identical functions to those of the members in the embodiments described above are given the same reference signs and explanations thereof are omitted.

As in Embodiment 3, the viewing angle controlling liquid crystal panel 5 of the present embodiment is characterized in that an overlap section is provided to each of a plurality of sections into which a first lower electrode 26 is divided so that there occurs no gap in shielding against a view in an oblique direction. However, the present embodiment is different from Embodiment 3 in that the first lower electrode is divided into three sections whereas a first lower electrode 26 is divided into two sections in Embodiment 3. This arrangement is explained below.

As illustrated in FIG. 7, the viewing angle controlling liquid crystal panel 5 according to the present embodiment includes a first lower electrodes 26g, 26h, and 26i, to each of which a voltage can be individually applied.

Specifically, as illustrated in (a) of FIG. 8 and (b) of FIG. 8, the first lower electrode 26g that is an overall electrode is provided on a first lower substrate 27 so as to cover an entire surface of a screen. The first lower electrode 26h and the first lower electrode 26i are provided, above the first lower electrode 26g via the transparent insulating film 40, in the same layer on the transparent insulating film 40. However, the first lower electrodes 26h and 26i are not provided above an entire surface of the first lower electrode 26g. In sections where neither the first lower electrode 26h nor the first lower electrode 26i is provided, the first lower electrode 26g that is provided as a lower layer of the first lower electrodes 26h and 26i is exposed.

Specifically, each of the first lower electrode 26h and the first lower electrode 26i includes a plurality of stripe-shaped electrodes provided at a regular interval in parallel to each other. The entire surface of the screen is covered alternately by the first lower electrode 26h, the first lower electrode 26i, and the first lower electrode 26g which is exposed in the sections where neither the first electrode 26h nor the first lower electrode 26i is provided.

With this arrangement, there occurs no gap in the first lower electrode 26 as in Embodiment 3. As a result, the viewing angle controlling liquid crystal panel 5 according to the present embodiment does not have a gap in shielding when viewed in an oblique direction.

Further, in the present embodiment, it is possible to apply three different voltages to the first lower electrode 26. Accordingly, in the first liquid crystal layer 15, three areas each including liquid crystal molecules 17 of different tilts can be produced. This makes it possible to more precisely control retardations with respect to various directions including not only an up-and-down direction but also a right-left direction. As a result, uniformity of a shielding effect in the screen can be further improved.

The present invention is not limited to the description of the embodiments above, but may be altered by a skilled person within the scope of the claims. An embodiment based on a proper combination of technical means disclosed in different embodiments is encompassed in the technical scope of the present invention.

As described above, in a viewing angle controlling liquid crystal panel of the present invention: linearly polarized light enters the liquid crystal layer and the liquid crystal layer is provided, on a light exit side of the liquid crystal layer, with a polarizing plate transmitting only a component of light having exited from the liquid crystal layer, the component being parallel to the polarization axis of the linearly polarized light having entered the liquid crystal; the liquid crystal layer includes liquid crystal molecules that are tilted, due to voltage application to the liquid crystal layer, in a direction parallel to or perpendicular to the polarization axis of the linearly polarized light having entered the liquid crystal layer; and the electrode is capable of applying two or more different voltages to the liquid crystal layer simultaneously. This provides an advantageous effect of providing a viewing angle controlling liquid crystal display panel and a display device in each of which uniformity of a shielding effect in a screen is further improved.

INDUSTRIAL APPLICABILITY

The liquid crystal display device of the present invention can switch between a wide viewing angle and a narrow viewing angle. Therefore, the liquid crystal display device of the present invention is suitably used for, for example, a display device that has a display showing contents that a user do not want others to view.

The invention claimed is:

1. A viewing angle controlling liquid crystal panel provided on a front surface or a back surface of a display panel and controlling a viewing angle of an image displayed on the display panel, the viewing angle controlling liquid crystal panel comprising:
    a liquid crystal layer; and
    an electrode for applying a voltage to the liquid crystal layer,
    wherein:
    linearly polarized light enters the liquid crystal layer and the liquid crystal layer is provided, on a light exit side of the liquid crystal layer, with a polarizing plate transmitting only a component of light having exited from the liquid crystal layer, the component being parallel to the polarization axis of the linearly polarized light having entered the liquid crystal;
    the liquid crystal layer includes liquid crystal molecules that are tilted, due to voltage application to the liquid crystal layer, in a direction parallel to or perpendicular to the polarization axis of the linearly polarized light having entered the liquid crystal layer;
    the electrode is divided into two or more areas so as to be able to apply two or more different voltages to the liquid crystal layer; and
    the two or more areas into which the electrode is divided partially overlap with each other via an insulating layer so that no gap is provided between the two or more areas of the electrode in a plane view.

2. The viewing angle controlling liquid crystal panel as set forth in claim 1, wherein: the liquid crystal layer is provided with another polarizing plate on a light entrance side of the liquid crystal layer; and the another polarizing plate provided on the light entrance side has a transmission axis parallel to the transmission axis of the polarizing plate provided on the light exit side.

3. The viewing angle controlling liquid crystal panel as set forth in claim 2, wherein: the transmission axis of the another polarizing plate provided on the light entrance side of the liquid crystal layer is parallel to or perpendicular to a direction in which the liquid crystal molecules are tilted due to voltage application to the liquid crystal layer.

4. The viewing angle controlling liquid crystal panel as set forth in claim 1, wherein: on a light entrance side of the liquid crystal layer, a wave plate and another polarizing plate are provided in this order from the liquid crystal layer; and by passing of linearly polarized light through the wave plate provided on the light entrance side which linearly polarized light has passed through the another polarizing plate provided on the light entrance side, a polarization axis of the linearly polarized light becomes parallel to or perpendicular to a direction in which the liquid crystal molecules are tilted due to voltage application to the liquid crystal layer.

5. The viewing angle controlling liquid crystal panel as set forth to claim 1, wherein: a wave plate is provided between the polarizing plate provided on the light exit side of the liquid crystal layer and the liquid crystal layer; and by passing of linearly polarized light through the wave plate on the light exit side which linearly polarized light has exited from the liquid crystal layer, a polarization axis of the linearly polarized light becomes parallel to or perpendicular to a transmission axis of the polarizing plate provided on the light exit side.

6. The viewing angle controlling liquid crystal panel as set forth in claim 1, wherein: the liquid crystal molecules are arranged in any one of homogeneous alignment, homeotropic alignment, hybrid alignment of homogeneous alignment and homeotropic alignment, splay alignment, and bend alignment.

7. A display device comprising: the viewing angle controlling liquid crystal panel as set forth in claim 1; and a display panel.

8. The display device as set forth in claim 7, wherein: the display panel is a liquid crystal panel.

9. The viewing angle controlling liquid crystal panel as set forth in claim 1, wherein the electrode is capable of applying two or more different voltages to the liquid crystal layer simultaneously.

* * * * *